(12) United States Patent
Ueyama

(10) Patent No.: US 7,810,977 B2
(45) Date of Patent: Oct. 12, 2010

(54) BACKLIGHT DEVICE AND DISPLAY DEVICE USING THE SAME

(75) Inventor: Munetoshi Ueyama, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 5 days.

(21) Appl. No.: 12/159,878

(22) PCT Filed: Oct. 25, 2006

(86) PCT No.: PCT/JP2006/321221

§ 371 (c)(1),
(2), (4) Date: Jul. 2, 2008

(87) PCT Pub. No.: WO2007/122758

PCT Pub. Date: Nov. 1, 2007

(65) Prior Publication Data

US 2009/0290328 A1    Nov. 26, 2009

(30) Foreign Application Priority Data

Apr. 19, 2006  (JP) .............................. 2006-115882

(51) Int. Cl.
*G02B 6/10* (2006.01)
(52) U.S. Cl. ...................... 362/610; 362/621; 362/616; 362/97.3
(58) Field of Classification Search ................ 362/608, 362/610, 613, 612, 614, 621, 616, 626, 97.3
See application file for complete search history.

(56) References Cited

U.S. PATENT DOCUMENTS

| | | | | |
|---|---|---|---|---|
| 6,951,401 | B2 * | 10/2005 | Van Hees et al. ............ | 362/612 |
| 7,188,988 | B2 * | 3/2007 | Koganezawa ................ | 362/616 |
| 7,213,960 | B2 * | 5/2007 | Yoo .......................... | 362/634 |
| 7,413,334 | B2 * | 8/2008 | Baba .......................... | 362/616 |
| 7,585,098 | B2 * | 9/2009 | Mikami ....................... | 362/608 |
| 2006/0022935 | A1 | 2/2006 | Sakai et al. | |
| 2006/0114690 | A1 * | 6/2006 | Iki et al. ...................... | 362/612 |
| 2009/0303417 | A1 * | 12/2009 | Mizushima et al. ........... | 349/65 |

FOREIGN PATENT DOCUMENTS

| | | |
|---|---|---|
| JP | 2003-057622 A | 2/2003 |
| JP | 2004-171947 A | 6/2004 |
| JP | 2005-250020 A | 9/2005 |
| JP | 2005-338290 A | 12/2005 |

OTHER PUBLICATIONS

Official communication issued in the International Application No. PCT/JP2006/321221, mailed on Jan. 9, 2007.

* cited by examiner

*Primary Examiner*—Jong-Suk (James) Lee
*Assistant Examiner*—Leah S Lovell
(74) *Attorney, Agent, or Firm*—Keating & Bennett, LLP

(57) ABSTRACT

A backlight device includes a main light guide plate, auxiliary light guide portions provided on the side of an opposed surface of the main light guide plate, and light sources arranged to emit light into the auxiliary light guide portions. A reflector is arranged to surround the introduction surface of the main light guide plate and the auxiliary light guide portions. Furthermore, an optical path forming member is provided on the inside of the reflector so as to form a dedicated optical path from the auxiliary light guide plate to the main light guide plate. Thereby, the light emitted from one auxiliary light guide portion is prevented from entering into another auxiliary light guide portion.

12 Claims, 4 Drawing Sheets

BACKLIGHT DEVICE AND DISPLAY DEVICE USING THE SAME

BACKGROUND OF THE INVENTION

1. Field of the Invention

The present invention relates to a backlight device using a linear light source such as a cold cathode tube and a point light source such as an LED, and a display device using the same.

2. Description of the Related Art

In recent years, as a flat panel display having features of a smaller thickness and a smaller weight compared with a conventional cathode ray tube, a liquid crystal display device, for example, has been used widely for a liquid crystal television, a monitor, a mobile phone and the like. Such a liquid crystal display device includes a backlight device that emits light and a liquid crystal panel that serves as a shutter with respect to light from a light source provided in the backlight device, thereby displaying a desired image.

In the above-noted backlight device, a linear light source such as a cold cathode tube or a point light source such as a light-emitting diode (LED) is used such that light from these light sources is turned to planar light having a substantially uniform brightness and irradiated onto the liquid crystal panel.

Further, the backlight devices are roughly classified into those of a direct light type and those of an edge light type according to the light source arrangement relative to the liquid crystal panel. In other words, in the direct light-type backlight device, the light source is arranged on a lower side (a non-display surface side) of the liquid crystal panel, and a diffusing plate is interposed between the light source and the liquid crystal panel so as to allow the above-noted planar light to enter the liquid crystal panel.

On the other hand, the edge light-type backlight device has a configuration in which the light source is arranged on a lateral side of the liquid crystal panel, and light from this light source is introduced to a light guide plate that is disposed on the lower side of the liquid crystal panel. Then, in the edge light-type backlight device, the light from the light source is turned to the above-noted planar light by the light guide plate and irradiated from a light emitting surface of the light guide plate arranged in opposition to the non-display surface of the liquid crystal panel.

Also, in a conventional backlight device, it has been suggested to use a plurality of auxiliary light guide plates in addition to a main light guide plate that is arranged in opposition to the liquid crystal panel, as described in JP 2005-250020 A, for example. More specifically, in this conventional backlight device, two auxiliary light guide plates are stacked sequentially on the above-mentioned main light guide plate on the side of an opposed surface that is opposed to a light emitting surface of the main light guide plate, and light from a plurality of LEDs that are aligned is allowed to enter inner portions of the respective auxiliary light guide plates. Then, in this conventional backlight device, the light emitted from each of the auxiliary light guide plates is introduced to the main light guide plate by using a reflecting mirror, thereby increasing the number of the LEDs to be disposed so as to achieve higher brightness while reducing the device size.

However, in the conventional backlight device as described above, since the light that has left each of the auxiliary light guide plates is led to the main light guide plate by being reflected by the reflecting mirror (reflector), a utilization efficiency of the light from the LED (light source) has lowered in some cases depending on a light reflection angle at the reflecting mirror, which is defined by a radius of curvature, a reflectance, etc. of an inner surface of the reflecting mirror, and the number of the auxiliary light guide plates to be disposed. In other words, in the auxiliary light guide plates that are stacked in two tiers on the main light guide plate in the conventional backlight device, there have been some cases where the light that has left the auxiliary light guide plate in the first tier enters the inner portion of the auxiliary light guide plate in the second tier via the reflecting mirror, or conversely, the light that has left the auxiliary light guide plate in the second tier enters the inner portion of the auxiliary light guide plate in the first tier via the reflecting mirror. As a result, in the conventional backlight device, the light from each of the auxiliary light guide plates has not been led directly to the main light guide plate but has been absorbed by the inner portion of the auxiliary light guide plate to which the light has led erroneously via the reflecting mirror, resulting in the reduction of the utilization efficiency of light from the LED.

SUMMARY OF THE INVENTION

In view of the problems described above, preferred embodiments of the present invention provide a backlight device that has a high light utilization efficiency and achieves a high brightness, and a display device including such a backlight device.

A backlight device according to a preferred embodiment of the present invention is a backlight device including a plurality of light sources, and a main light guide plate that has an introduction surface into which light from the light sources is introduced, a light emitting surface arranged to emit the light from the light sources introduced from the introduction surface to an outside, and an opposed surface in opposition to the light emitting surface, a plurality of auxiliary light guide portions that are disposed as a stack on the main light guide plate on a side of the opposed surface and lead light from any of the plurality of light sources to the introduction surface of the main light guide plate, a reflector that introduces the light from the light sources from the auxiliary light guide portions to the main light guide plate, and an obstructing portion that is disposed inside a space surrounded by the reflector and obstructs an entry of the light that has left one of the auxiliary light guide portions in an inner portion of the other auxiliary light guide portion.

In the backlight device with the above-described configuration, inside the space surrounded by the reflector, the obstructing portion obstructs the entry of the light that has left one of the auxiliary light guide portions in the inner portion of the other auxiliary light guide portion. In this way, unlike the conventional example described above, the light absorption in the inner portion of the auxiliary light guide portion can be prevented, thus making it possible to prevent the reduction of the utilization efficiency of the light from the light sources, even when achieving higher brightness. Accordingly, a backlight device with a high light utilization efficiency and a high brightness can be achieved.

Also, in the backlight device described above, first to Nth (N being an integer equal to or larger than 2) auxiliary light guide portions that are stacked on the opposed surface of the main light guide plate in this order from the side of the opposed surface may be used as the plurality of auxiliary light guide portions, and (N−1) optical path forming members that respectively form dedicated optical paths in which light from the first to (N−1)th auxiliary light guide portions travels toward the main light guide plate may be used as the obstructing portion.

In this case, the individual (N−1) optical path forming members prevent the light absorption in the inner portion of the auxiliary light guide portion, thus making it possible to prevent the reduction of the utilization efficiency of the light from the light sources reliably.

Further, in the backlight device described above, it is preferable that a reflecting member that is provided between the two adjacent auxiliary light guide portions is used as the optical path forming members.

In this case, the number of components can be reduced, thereby achieving a low-cost backlight device easily.

Moreover, in the backlight device described above, first to Nth (N being an integer equal to or larger than 2) auxiliary light guide portions that are stacked on the opposed surface of the main light guide plate in this order from the side of the opposed surface may be used as the plurality of auxiliary light guide portions, and (N−1) inclined members that are respectively provided to the first to (N−1)th auxiliary light guide portions at predetermined inclination angles so as to cover the auxiliary light guide portions may be used as the obstructing portion.

In this case, the individual (N−1) inclined members prevent the light absorption in the inner portion of the auxiliary light guide portion, thus making it possible to prevent the reduction of the utilization efficiency of the light from the light sources reliably.

Also, in the backlight device described above, it is preferable that a reflecting member that is provided between the two adjacent auxiliary light guide portions is used as the inclined members.

In this case, the number of components can be reduced, thereby achieving a low-cost backlight device easily.

Further, in the backlight device described above, it is preferable that a reflecting member that is provided on a side of the opposed surface of the auxiliary light guide portion that is the farthest from the main light guide plate among the plurality of auxiliary light guide portions is used as the reflector.

In this case, the number of components can be reduced, thereby achieving a low-cost backlight device easily.

Moreover, in the backlight device described above, the light sources may be arranged in a space surrounded by a reflecting member that is provided on the side of the opposed surface of each of the plurality of auxiliary light guide portions and the corresponding auxiliary light guide portion.

In this case, the ratio of light entering the light entering surface of the auxiliary light guide portion from the light sources can be raised by the reflecting member, resulting in an improved utilization efficiency of the light from the light sources.

Also, in the backlight device described above, it is preferable that a light guide plate that is formed of a resin material is used as the auxiliary light guide portions.

In this case, the plurality of auxiliary light guide portions can be provided easily on the main light guide plate on the side of the opposed surface.

Further, in the backlight device described above, a light-emitting diode may be used as the light sources.

In this case, since the light-emitting diode is used as the light sources, it is possible to suppress the power consumption of the backlight device easily.

Moreover, in the backlight device described above, a discharge tube may be used as the light sources.

In this case, since the discharge tube is used as the light sources, it is possible to achieve a higher brightness of the backlight device easily.

Also, in the backlight device described above, both of a plurality of light-emitting diodes that are aligned and a discharge tube may be used as the light sources.

In this case, since the discharge tube that is less expensive than the plurality of light-emitting diodes is used, it is possible to reduce the cost of the backlight device easily.

Additionally, a display device according to another preferred embodiment of the present invention includes a display portion, wherein light from any of the backlight devices described above is irradiated on the display portion.

In the display device with the above-described configuration, the light from the backlight device with a high light utilization efficiency and a high brightness is allowed to enter the display portion, so that a display device having an excellent display performance can be achieved easily.

In accordance with preferred embodiments of the present invention, it becomes possible to provide a backlight device that has a high light utilization efficiency and achieves a high brightness, and a display device including such a backlight device.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

The following is a description of preferred embodiments of a backlight device according to the present invention and a display device using the same, with reference to the accompanying drawings. It should be noted that the following description will be directed to exemplary cases of applying the present invention to a transmission-type liquid crystal display device.

Preferred Embodiment 1

Figure 1:
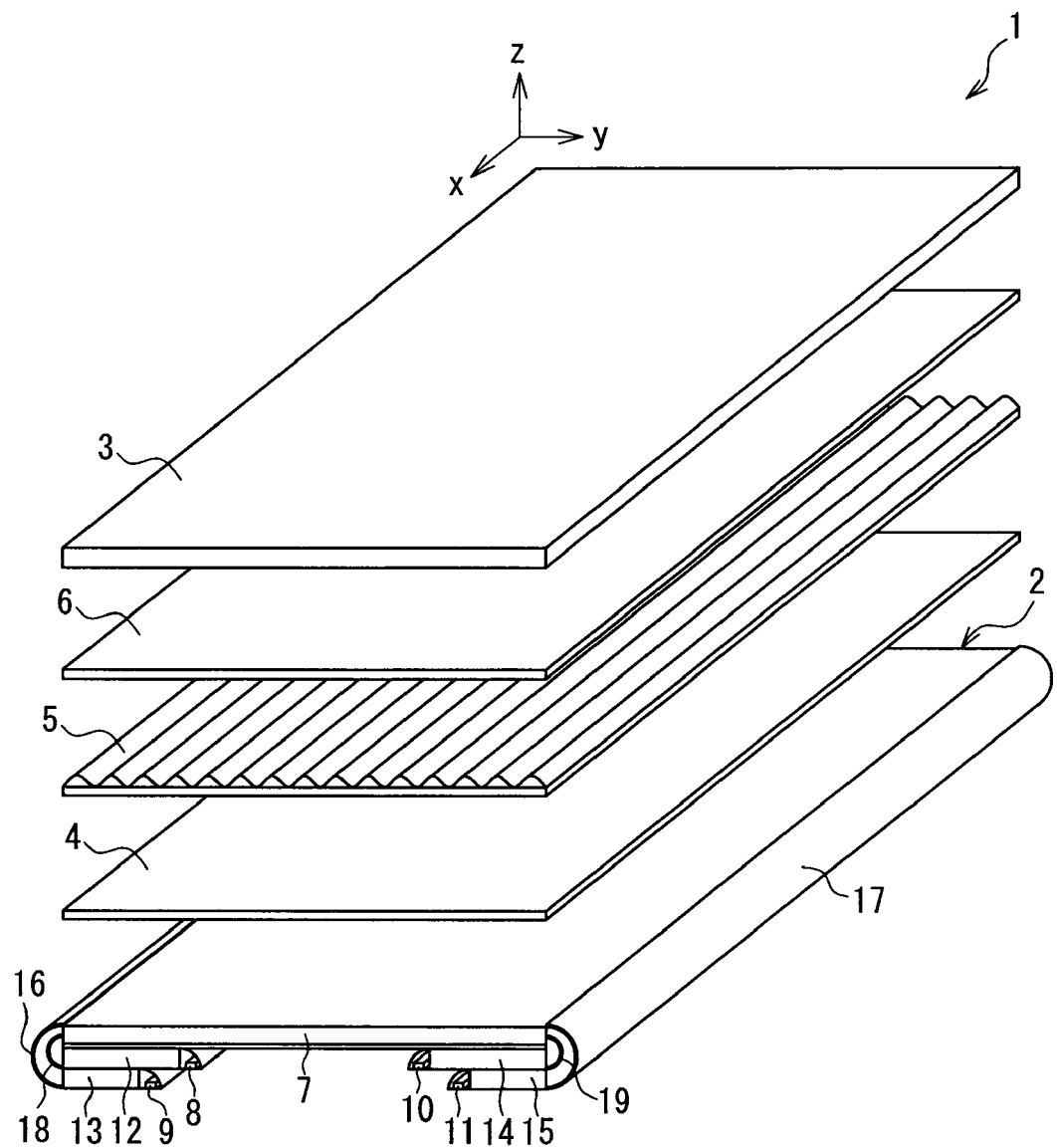
FIG. 1 is a perspective view for describing a backlight device and a liquid crystal display device according to Preferred Embodiment 1 of the present invention.

FIG. 1 is a perspective view for describing a backlight device and a liquid crystal display device according to Preferred Embodiment 1 of the present invention. Referring to the figure, in the present preferred embodiment, a backlight device 2 of the present invention and a liquid crystal panel 3 serving as a display portion to which light from the backlight device 2 is irradiated are provided and integrated as a transmission-type liquid crystal display device 1. In the liquid crystal display device 1, a diffusing sheet 4, a prism (focusing) sheet 5 and a polarizing sheet 6 are disposed between the backlight device 2 and the liquid crystal panel 3, for example. These optical sheets increase the brightness of illumination light from the backlight device 2 emitted in a direction indicated as a z direction in FIG. 1, thus improving the display performance of the liquid crystal panel 3. Incidentally, in the liquid crystal panel 3, a 23-inch-diagonal display screen whose aspect ratio along a width direction and a height direction, which are indicated respectively by an x direction and a y direction in FIG. 1, is 16:9 faces upward in FIG. 1, for example.

The backlight device 2 includes a substantially rectangular parallelepiped main light guide plate 7 that is disposed on an upper side of the figure and has a light emitting surface provided on the side of the liquid crystal panel 3, light-emitting diodes (in the following, abbreviated as "LEDs") 8, 9, 10 and 11 serving as light sources disposed on a lower side of the main light guide plate 7, and auxiliary light guide plates 12, 13, 14 and 15 serving as auxiliary light guide portions that light from the LEDs 8 to 11 enters respectively. Further, the backlight device 2 includes a reflector 16 that is arranged so as to surround an introduction surface of the main light guide plate 7 and light leaving surfaces of the auxiliary light guide plates 12 and 13, and a reflecting member 18 that is provided inside a space surrounded by this reflector 16 and serves as an optical path forming member. Moreover, the backlight device 2 includes a reflector 17 that is arranged so as to surround an introduction surface of the main light guide plate 7 and light leaving surfaces of the auxiliary light guide plates 14 and 15, and a reflecting member 19 that is provided inside a space surrounded by this reflector 17 and serves as an optical path forming member.

Additionally, in the backlight device 2, the configuration below the main light guide plate 7 is right-left symmetrical (along the y direction) in FIG. 1. In other words, the LEDs 8 and 9 respectively have the same configuration as the LEDs 10 and 11, and the auxiliary light guide plates 12 and 13 respectively are the same as the auxiliary light guide plates 14 and 15. Further, the reflector 16 is the same as the reflector 17, and the reflecting member 18 is the same as the reflecting member 19.

Figure 2:
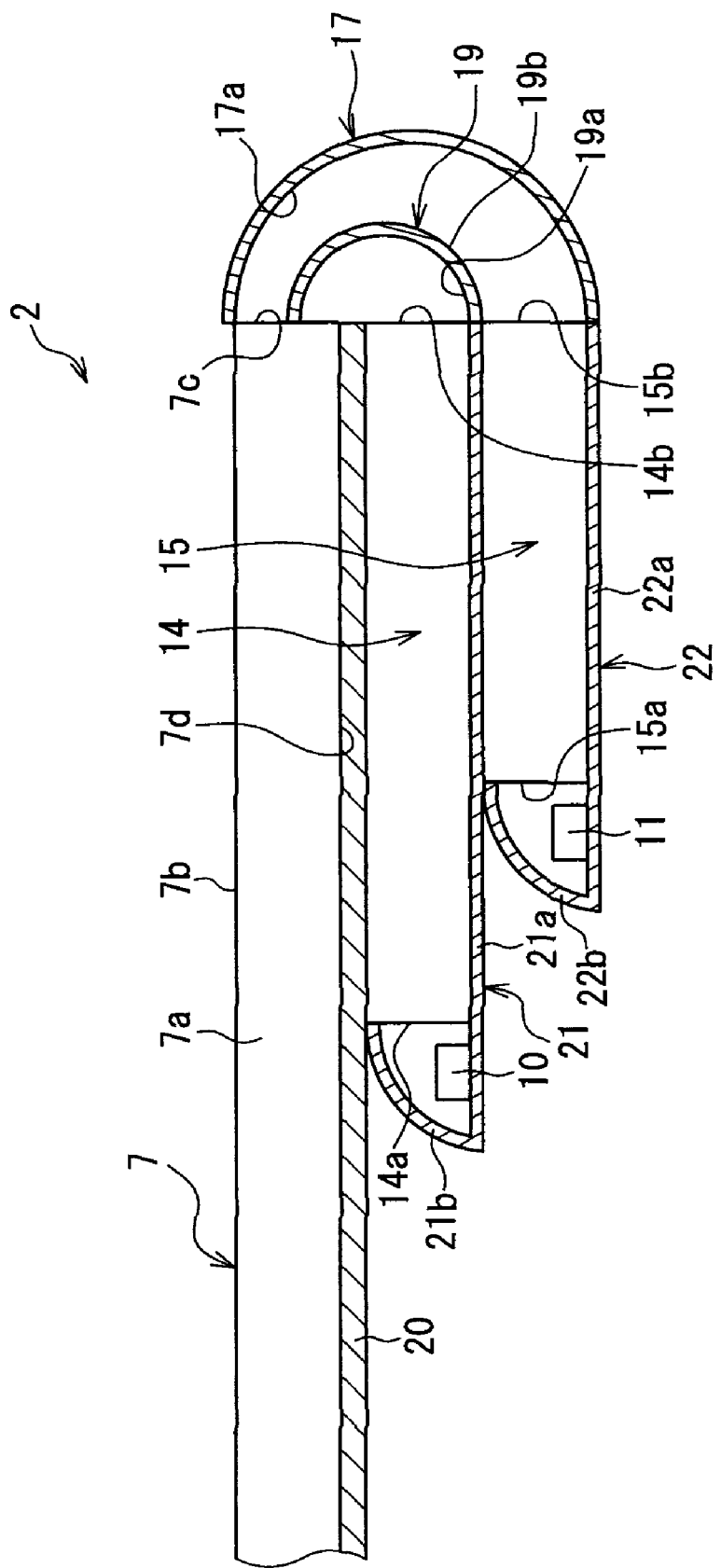
FIG. 2 is an enlarged sectional view for describing a configuration of a main portion of the above-noted backlight device.

Herein, also referring to FIG. 2, the backlight device 2 will be described more specifically. FIG. 2 is an enlarged sectional view for describing a configuration of a main portion of the above-noted backlight device. Incidentally, in the following description, one side of the right-left symmetrical configuration in FIG. 1 (the right side of FIG. 1) will be illustrated mainly in FIG. 2, and a redundant description of the configuration on the left side of FIG. 1, which is the same as that on the right side, will be omitted for the sake of simplicity (the same applies also to Preferred Embodiments 2 and 3 described below).

The main light guide plate 7 is formed of a transparent synthetic resin such as an acrylic resin, for example, and includes a light guide plate main body 7a whose cross-section is rectangular or substantially rectangular, the light emitting surface 7b mentioned above and introduction surfaces 7c that are provided on both lateral surfaces along a longitudinal direction (the x direction) of the light guide plate main body 7a. As described in detail later, from a dedicated optical path provided for each of the auxiliary light guide plates, light from the corresponding LED to the main light guide plate 7 is allowed to enter this introduction surface 7c. Further, the main light guide plate 7 has an opposed surface 7d that is opposed to the light emitting surface 7b. In the main light guide plate 7, a reflecting member 20 is arranged on the opposed surface 7d so as to cover the entire surface of the opposed surface 7d.

For the reflecting member 20, a synthetic resin film with a highly light reflective color such as white or silver or a metal plate with a mirror-finished surface is preferably used. The reflecting member 20 reflects the light from each of the LEDs 8 to 11 introduced from the introduction surface 7c. In this way, in the main light guide plate 7, the above-noted individual light is irradiated as the planar illumination light from the light emitting surface 7b toward the liquid crystal panel 3 while being led to a center portion along the y direction in FIG. 1. Further, in the reflecting member 20, a light reflecting function is provided not only on a surface of the main light guide plate 7 on the side of the opposed surface 7d but also on a surface that is opposed to this surface and contacts the auxiliary light guide plate 14 so that light from the LED 10 is reflected suitably.

The auxiliary light guide plate 14 is, for example, a transparent synthetic resin such as an acrylic resin whose cross-section is rectangular or substantially rectangular, and includes a light entering surface 14a that the light from the LED 10 enters and a light leaving surface 14b that the light that has entered from the light entering surface 14a leaves. Also, in the auxiliary light guide plate 14, a reflecting member 21 is disposed on a surface on the side of an opposed surface of the auxiliary light guide plate 14 so as to cover this surface. More specifically, the reflecting member 21 is preferably formed of a synthetic resin film with a highly light reflective color such as white or silver or a metal plate with a mirror-finished surface, and has a flat plate portion 21a and a circular arc portion 21b that is formed continuously so as to have a circular arc cross-section at one end of this flat plate portion 21a. Then, the reflecting member 21 is attached to the auxiliary light guide plate 14 such that the flat plate portion 21a covers the entire surface of the auxiliary light guide plate 14 on the side of the opposed surface thereof. Further, in the reflecting member 21, a light reflecting function is provided not only on a surface on the side of the auxiliary light guide plate 14 but also on a surface that is opposed to this surface and contacts the auxiliary light guide plate 15 so that light from the LED 11 is reflected suitably.

The LED 10 includes, for example, R, G and B light-emitting diodes that emit red light, green light and blue light, respectively, and a plurality of the LEDs 10, each consisting of a set of R, G and B light-emitting diodes, are used. These plurality of the LEDs 10 are provided according to the configurations of the other LEDs 8, 9 and 11, the size of the liquid crystal panel 3, the brightness required in this liquid crystal panel 3, etc., and arranged at predetermined intervals along a direction perpendicular to a sheet of paper of FIG. 2 (the x direction in FIG. 1). Also, the LEDs 10 are mounted on one end of the flat plate portion 21a of the reflecting member 21 and arranged in a space surrounded by the circular arc portion 21b of this reflecting member 21 and the light entering surface 14a of the auxiliary light guide plate 14. In this manner, the reflecting member 21 allows the light from the LED 10 to enter the light entering surface 14a of the auxiliary light guide plate 14 efficiently, resulting in an improved utilization efficiency of the light from this LED 10.

Moreover, in the auxiliary light guide plate 14, the light of the LED 10 that has entered from the light entering surface 14a is reflected alternately by the reflecting members 20 and 21 and thereby led inside this auxiliary light guide plate 14 toward the light leaving surface 14b, and then leaves the light leaving surface 14b to the side of the reflecting member 19. Also, the auxiliary light guide plate 14 is a so-called light guide plate for color mixture, which mixes the individual light of R, G and B emitted from the LEDs 10 so as to obtain white light in the process of leading them to the light leaving surface 14b, and allows this white light to leave the auxiliary light guide plate 14.

The auxiliary light guide plate 15 is, for example, a transparent synthetic resin such as an acrylic resin whose cross-section is rectangular or substantially rectangular, and includes a light entering surface 15a that the light from the LED 11 enters and a light leaving surface 15b that the light that has entered from the light entering surface 15a leaves. Also, in the auxiliary light guide plate 15, a reflecting member 22 is disposed on a surface on the side of an opposed surface of the auxiliary light guide plate 15 so as to cover this surface. More specifically, the reflecting member 22 is formed of a synthetic resin film with a highly light reflective color such as white or silver or a metal plate with a mirror-finished surface, and has a flat plate portion 22a and a circular arc portion 22b that is formed continuously so as to have a circular arc cross-section at one end of this flat plate portion 22a. Then, the reflecting member 22 is attached to the auxiliary light guide plate 15 such that the flat plate portion 22a covers the entire surface of the auxiliary light guide plate 15 on the side of the opposed surface thereof.

The LED 11 includes, for example, R, G and B light-emitting diodes that emit red light, green light and blue light, respectively, and a plurality of the LEDs 11, each consisting of a set of R, G and B light-emitting diodes, are used. These plurality of the LEDs 11 are provided according to the configurations of the other LEDs 8, 9 and 10, the size of the liquid crystal panel 3, the brightness required in this liquid crystal panel 3, etc., and arranged at predetermined intervals along a direction perpendicular to a sheet of paper of FIG. 2 (the x direction in FIG. 1). Also, the LEDs 11 are mounted on one end of the flat plate portion 22a of the reflecting member 22 and arranged in a space surrounded by the circular arc portion 22b of this reflecting member 22 and the light entering surface 15a of the auxiliary light guide plate 15. In this manner, the reflecting member 22 allows the light from the LED 11 to enter the light entering surface 15a of the auxiliary light guide plate 15 efficiently, resulting in an improved utilization efficiency of the light from this LED 11.

Moreover, in the auxiliary light guide plate 15, the light of the LED 11 that has entered from the light entering surface 15a is reflected alternately by the reflecting members 21 and 22 and thereby led inside this auxiliary light guide plate 15 toward the light leaving surface 15b, and then leaves the light leaving surface 15b to the side of the reflector 17. Also, the auxiliary light guide plate 15 is a so-called light guide plate for color mixture, which mixes the individual light of R, G and B emitted from the LEDs 11 so as to obtain white light in the process of leading them to the light leaving surface 15b, and allows this white light to leave the auxiliary light guide plate 15. In other words, the auxiliary light guide plate 15 is constituted so as to be capable of mixing the individual light of R, G and B to obtain white light appropriately and introducing this white light into the main light guide plate 7, similarly to the auxiliary light guide plate 14. In this manner, the main light guide plate 7 can irradiate the appropriate white light onto the liquid crystal panel 3 so as to prevent the brightness from becoming uneven on the display surface, thus making it possible to improve a display quality of the liquid crystal display device 1.

The reflector 17 and the reflecting member 19 are preferably formed to have a semicircular cross-section and constituted by a synthetic resin film with a highly light reflective color such as white or silver or a metal plate with a mirror-finished surface. More specifically, an inner peripheral surface 17a of the reflector 17 and an inner peripheral surface 19a and an outer peripheral surface 19b of the reflecting member 19 are provided with a high light reflecting function, thereby minimizing the absorption of the light from the LEDs 10 and 11.

One end and the other end of the reflector 17 are connected air-tightly to the other end of the flat plate portion 22a of the reflecting member 22 and the introduction surface 7c on the side of the light emitting surface 7b (on an upper end side), respectively, thereby minimizing the generation of leakage light to an outside.

One end and the other end of the reflecting member 19 are connected to the other end of the flat plate portion 21a of the reflecting member 21 and the introduction surface 7c midway between the light emitting surface 7b and the opposed surface 7d (in a center portion along the vertical direction in FIG. 2), respectively. In this way, an optical path dedicated to the light from the LED 10 is formed by the reflecting member 19, so that the light is led from the auxiliary light guide plate 14 to the main light guide plate 7. Further, an optical path dedicated to the light from the LED 11 is formed by the reflector 17 and the reflecting member 19, so that the light is led from the auxiliary light guide plate 15 to the main light guide plate 7.

In the present preferred embodiment with the above-described configuration, the reflecting members (obstructing portions) 18 and 19 are provided inside the spaces surrounded by the reflectors 16 and 17, respectively, thus forming the optical paths dedicated to the light from the corresponding LEDs 8 to 11 led from the respective auxiliary light guide plates 12 to 15 to the main light guide plate 7. As a result, in the two tiers of the auxiliary light guide plates 12 and 13 and the two tiers of the auxiliary light guide plates 14 and 15 in the present preferred embodiment, for example, the entry of the light that has left the auxiliary light guide plate 13 and that of the light that has left the auxiliary light guide plate 15 into the inner portions of the auxiliary light guide plates 12 and 14 can be obstructed by the reflecting members 18 and 19, respectively. In this way, unlike the conventional example described above, regardless of the light reflection angle at the reflector, which is defined by the radius of curvature, the reflectance, etc., of this reflector and the number of the auxiliary light guide plates to be disposed, the light absorption in the inner portions of the auxiliary light guide plates 12 to 15 can be prevented, thus making it possible to prevent the reduction of the utilization efficiency of the light from the LEDs 8 to 11, even when achieving higher brightness. Also, since the reflectors 16 and 17 are used, the size of the backlight device 2 can be reduced easily. Furthermore, since the light from the backlight device 2 that has an excellent utilization efficiency of the light from the LEDs 8 to 11, a high brightness and a reduced size is allowed to enter the liquid crystal panel 3 as described above, the liquid crystal display device 1 that has a reduced size and an excellent display performance can be achieved easily.

Preferred Embodiment 2

Figure 3:
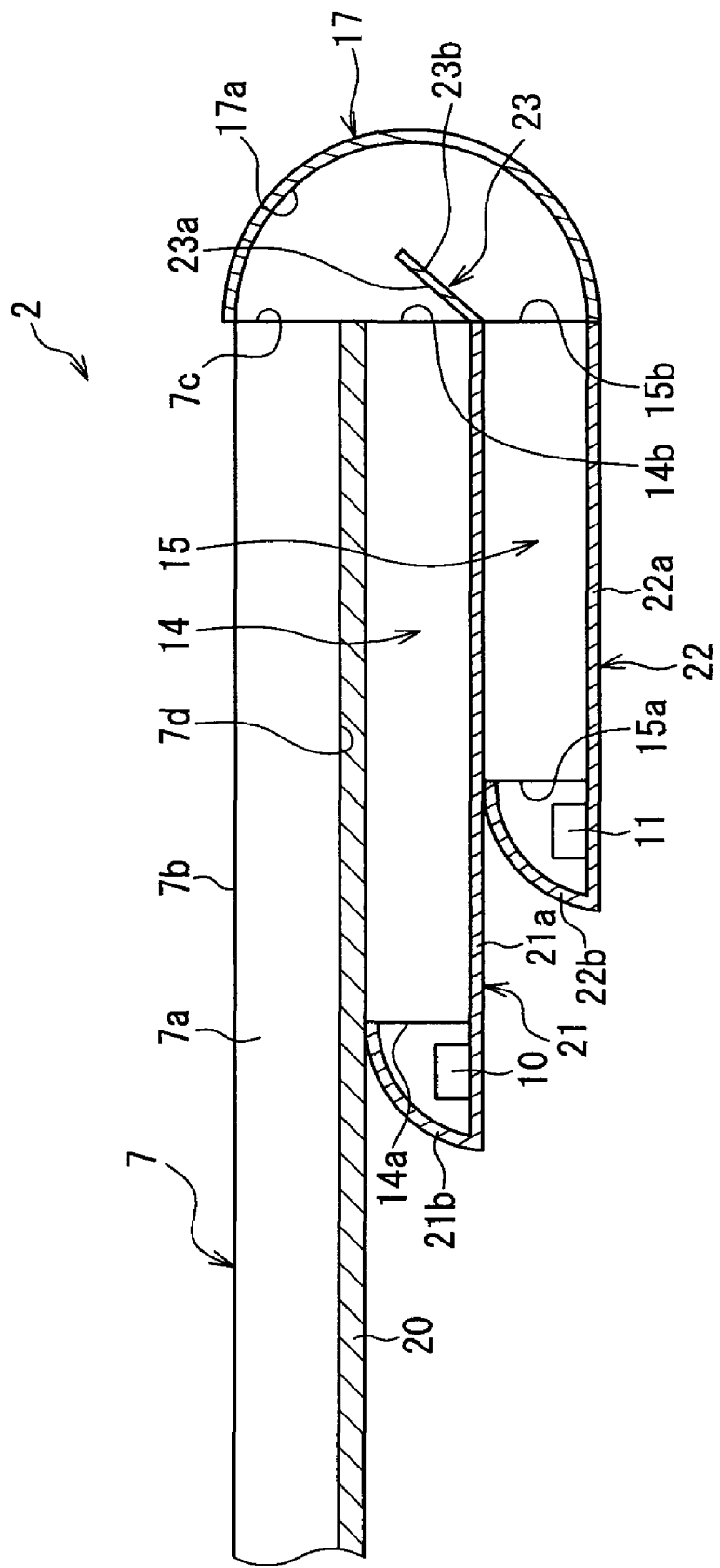
FIG. 3 is an enlarged sectional view for describing a configuration of a main portion of a backlight device according to Preferred Embodiment 2 of the present invention.

FIG. 3 is an enlarged sectional view for describing a configuration of a main portion of a backlight device according to Preferred Embodiment 2 of the present invention. In the figure, the present preferred embodiment is different from Preferred Embodiment 1 described above mainly in that the reflecting member (the optical path forming member) with a semicircular cross-section is replaced by a reflecting member (an inclined member) that is provided at a predetermined inclination angle on the light leaving surface of the auxiliary light guide plate so as to cover this light leaving surface. Incidentally, elements that are in common with Preferred Embodiment 1 described above are assigned the same reference signs, and the redundant description thereof will be omitted.

That is, as shown in FIG. 3, in the backlight device 2 according to the present preferred embodiment, a reflecting member 23 having a flat plate shape is provided inside the above-described space surrounded by the reflector 17. This reflecting member 23 is formed of a synthetic resin film with a highly light reflective color such as white or silver or a metal plate with a mirror-finished surface. Further, one end of the reflecting member 23 is connected to the other end of the flat plate portion 21a of the reflecting member 21, and the reflecting member 23 is provided at a predetermined inclination angle on the light leaving surface 14b of the auxiliary light guide plate 14 so as to cover this light leaving surface 14b. Then, in this reflecting member 23, the light from the LED 10 that has left the light leaving surface 14b of the auxiliary light guide plate 14 is reflected by a surface 23a and thereby introduced directly to the introduction surface 7c of the main light guide plate 7 and indirectly via the inner peripheral surface 17a of the reflector 17.

Further, in the reflecting member 23, the light from the LED 11 that has left the light leaving surface 15b of the auxiliary light guide plate 15 is reflected by the surface 23b, thereby obstructing the entry of this light into the inner portion of the auxiliary light guide plate 14 via the light leaving surface 14b. Moreover, the light from the LED 11 is allowed to travel toward the above-mentioned inner peripheral surface 17a so as to be introduced to the introduction surface 7c of the main light guide plate 7 reliably.

With the above configuration, inside the above-described space in which the reflecting member (obstructing portion) 23 is surrounded by the reflector 17, the present preferred embodiment obstructs the entry of the light that has left the auxiliary light guide plate 15 into the inner portion of the auxiliary light guide plate 14. Thus, the present preferred embodiment can produce effects similar to Preferred Embodiment 1 described above.

Preferred Embodiment 3

Figure 4:
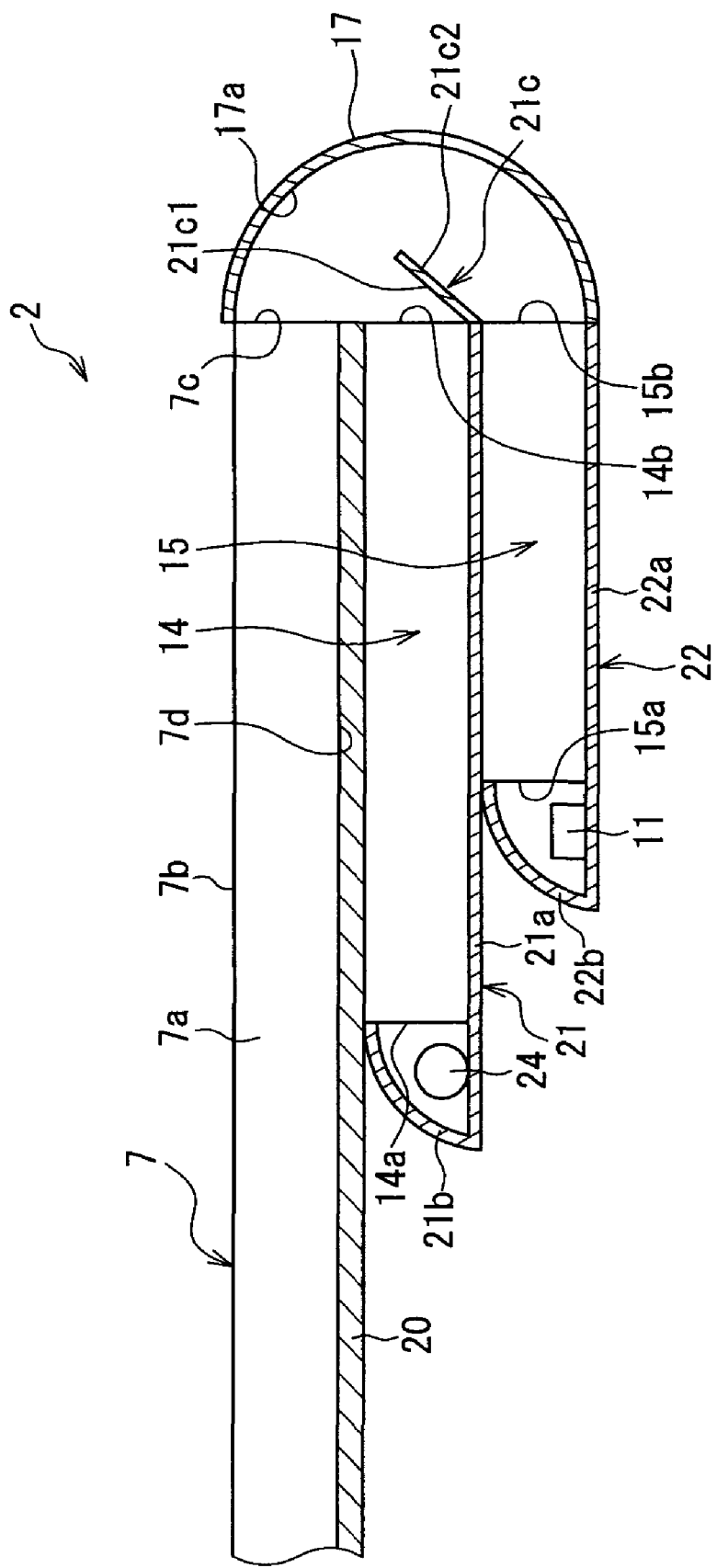
FIG. 4 is an enlarged sectional view for describing a configuration of a main portion of a backlight device according to Preferred Embodiment 3 of the present invention.

FIG. 4 is an enlarged sectional view for describing a configuration of a main portion of a backlight device according to Preferred Embodiment 3 of the present invention. In the figure, the present embodiment is different from Preferred Embodiment 2 described above mainly in that a cold cathode tube is used for the light source so as to provide a hybrid type backlight device using both the LED and the cold cathode tube. Incidentally, elements that are in common with Preferred Embodiment 2 described above are assigned the same reference signs, and the redundant description thereof will be omitted.

That is, as shown in FIG. 4, in the present preferred embodiment, one cold cathode tube 24 is mounted on the side of one end of the flat plate portion 21a of the reflecting member 21 and located in a space surrounded by the circular arc portion 21b of this reflecting member 21 and the light entering surface 14a of the auxiliary light guide plate 14. Also, in the reflecting member 21, an inclined portion 21c having a flat plate shape is formed continuously on the side of the other end of the flat plate portion 21a. This inclined portion 21c is provided at a predetermined inclination angle to the light leaving surface 14b of the auxiliary light guide plate 14 so as to cover this light leaving surface 14b and serves as an obstructing portion similarly to the reflecting member 23 in Preferred Embodiment 2 described above.

More specifically, in the inclined portion 21c, the light from the cold cathode tube 24 that has left the light leaving surface 14b of the auxiliary light guide plate 14 is reflected by a surface 21c1 and thereby introduced directly and indirectly via the inner peripheral surface 17a of the reflector 17 to the introduction surface 7c of the main light guide plate 7. Further, in the inclined portion 21c, the light from the LED 11 that has left the light leaving surface 15b of the auxiliary light guide plate 15 is reflected by a surface 21c2, thereby obstructing the entry of this light into the inner portion of the auxiliary light guide plate 14 via the light leaving surface 14b. Moreover, the light from the LED 11 is allowed to travel toward the above-mentioned inner peripheral surface 17a so as to be introduced to the introduction surface 7c of the main light guide plate 7 reliably.

With the above configuration, inside the above-described space in which the inclined portion (obstructing portion) 21c of the reflecting member is surrounded by the reflector 17, the present preferred embodiment obstructs the entry of the light that has left the auxiliary light guide plate 15 into the inner portion of the auxiliary light guide plate 14. Thus, the present preferred embodiment can produce effects similar to Preferred Embodiment 1 described above. Further, since the LED 10 including a plurality of single color LEDs of R, G and B is replaced by the low-cost cold cathode tube 24 in the present preferred embodiment, the costs of the backlight device 2 and the liquid crystal display device 1 can be reduced easily. Moreover, since the side of the other end of the reflecting member 21 serves as the inclined portion so that this reflecting member 21 and the obstructing portion are formed as one piece in the present preferred embodiment, it is possible both to reduce the number of components of the backlight device 2 and to reduce the number of assembly processes of this backlight device 2, so that the backlight device 2 and the liquid crystal display device 1 can be produced easily at low cost.

Further, besides the above description, by forming the other end of the reflecting member 21 to have a semicircular cross-section, it is also possible to form the reflecting member 19 and the reflecting member 21 illustrated in FIG. 2 as one piece, namely, form the reflecting member 19 and the optical path forming member (the obstructing portion) as one piece, instead of providing the inclined portion 21c. The reflecting member disposed between the two adjacent auxiliary light guide plates is used to form the inclined member or the optical path forming member as one piece in this manner, thereby making it possible to reduce the number of components of the backlight device 2, so that the backlight device 2 and the liquid crystal display device 1 can be produced easily at low cost.

It should be noted that the above-described preferred embodiments are all illustrative and not restrictive. The technological scope of the present invention is defined by the appended claims, and all changes that come within the range of equivalency of the claims are intended to be embraced therein.

For example, although the above description has been directed to the case of applying the present invention to a transmission-type liquid crystal display device, the backlight device of the present invention is not limited to this. The present invention can be applied to various display devices including a non-luminous display portion that utilizes light from a light source to display information such as an image and a character. More specifically, the backlight device according to the present invention can be used in a semitransmission-type liquid crystal display device or a projection-type display device such as a rear projection in a preferred manner.

Further, besides the above description, the present invention can be used in a preferred manner as a backlight device in a film viewer for irradiating light to a roentgenograph, a light box for irradiating light to a negative for better viewability or a light emitting device for illuminating a signboard or an advertisement or the like installed on a wall surface or other surface.

Moreover, although the above description has been directed to the configuration in which both of the lateral surfaces along the longitudinal direction (the x direction in FIG. 1) in the rectangular parallelepiped main light guide plate are used as the introduction surfaces, the present invention is not limited to this. It is also possible to use only one of the lateral surfaces along the longitudinal direction as the introduction surface or to use both lateral surfaces along a shorter side direction (the y direction in FIG. 1) as the introduction surfaces. In other words, it is also possible to dispose a frame-like light source and provide the auxiliary light guide plate and the reflector, thereby introducing light from the light source from all of the four lateral surfaces of the main light guide plate.

Moreover, although the above description has been directed to the case of using the main light guide plate with a rectangular or substantially rectangular cross-section whose light emitting surface and opposed surface are parallel or substantially parallel with each other, the main light guide plate according to the present invention is not limited to this. For example, it is also possible to use a main light guide plate with a wedge-shaped cross-section whose light emitting surface and opposed surface are not formed in parallel with each other. Also, besides the above description, the auxiliary light guide plate having a rectangular or substantially rectangular cross-section can be replaced by an auxiliary light guide plate having a wedge-shaped cross-section. Furthermore, besides the above description, the main light guide plate and the auxiliary light guide plate can also be formed using a glass material.

Additionally, the above description has been directed to the case of using the two auxiliary light guide plates that are disposed as a stack on the opposed surface of the main light guide plate as the auxiliary light guide portions. However, the auxiliary light guide portions of the present invention are appropriate as long as they are disposed as a stack on the side of the opposed surface of the main light guide plate and light from any of a plurality of the light sources enters therein. It is also possible to use three or more auxiliary light guide plates. Also, instead of using the light guide plate formed of the resin material as the auxiliary light guide portion as in each of the preferred embodiments described above, a space partitioned off by a partitioning member such as a reflecting member can also be used as the auxiliary light guide portion, for example. However, using the light guide plate formed of the resin material as in each of the preferred embodiments described above is more preferable because a plurality of the auxiliary light guide portions can be provided easily on the side of the opposed surface of the main light guide plate.

Further, Preferred Embodiment 1 described above has been directed to the case of using the reflecting member with a semicircular cross-section provided inside the reflector as the optical path forming member (the obstructing portion). However, the optical path forming member of the present invention is not limited at all as long as it can form a dedicated optical path from one auxiliary light guide portion to the main light guide plate. For example, when first to Nth (N being an integer equal to or larger than 2) auxiliary light guide portions are stacked on the opposed surface of the main light guide plate in this order from the side of this opposed surface, it is appropriate to provide (N−1) optical path forming members that respectively form dedicated optical paths in which light from the first to (N−1)th auxiliary light guide portions travels toward the main light guide plate. More specifically, in these (N−1) optical path forming members, it is appropriate that one end of each of the (N−1) optical path forming members should be connected to the introduction surface of the main light guide plate and the other end of each of these (N−1) optical path forming members should be connected to a border between the Nth auxiliary light guide portion and the (N−1)th auxiliary light guide portion so that the dedicated optical path is formed in which light from the (N−1)th auxiliary light guide portion from the side of the opposed surface travels to the main light guide plate.

Preferred Embodiments 2 and 3 described above have been directed to the case of using the reflecting member with a flat plate shape that is provided to the light leaving surface of the auxiliary light guide plate at a predetermined inclination angle so as to cover the light leaving surface as the inclined member (the obstructing portion). However, the inclined member of the present invention is not limited at all as long as it can obstruct the entry of light in the inner portion of one auxiliary light guide portion from the other auxiliary light guide portion. For example, when first to Nth (N being an integer equal to or larger than 2) auxiliary light guide portions are stacked on the opposed surface of the main light guide plate in this order from the side of this opposed surface, it is appropriate to use (N−1) inclined members that are respectively provided to the first to (N−1)th auxiliary light guide portions at predetermined inclination angles so as to cover these auxiliary light guide portions.

Moreover, besides the above description, the reflecting member provided on the side of the opposed surface of the auxiliary light guide portion that is the farthest from the main light guide plate among a plurality of the auxiliary light guide portions may be used to form the above-noted reflector. More specifically, by forming the other end of the above-noted reflecting member 22 to have a semicircular cross-section, it is possible to form the reflecting member 22 and the reflector 17 mentioned above as one piece. Such a configuration is preferable because a backlight device that is readily assembled can be achieved easily with a small number of components.

Additionally, although the above description has been directed to the configuration in which light from a plurality of the LEDs each consisting of a set of R, G and B is allowed to enter the light entering surface of each of the auxiliary light guide portions and mixed to obtain white light inside that auxiliary light guide portion, the present invention is not limited to this. A plurality of LEDs emitting white light may be provided in opposition to the light entering surface so that the light travels from the auxiliary light guide portion to the main light guide plate. Alternatively, for example, two different colors of light, e.g., light from a yellow LED and light from a blue LED may also be allowed to enter the inner portion of the auxiliary light guide portion, in which yellow light and blue light are mixed, so that white light can be introduced into the main light guide plate.

Further, although Preferred Embodiment 3 described above has been directed to the hybrid type backlight device using both the LED and the cold cathode tube as the light sources, the present invention is not limited to this. It is also possible to use a discharge tube other than the cold cathode tube such as a hot cathode tube or a xenon tube. Moreover, a discharge tube may be used for all the light sources. The use of a mercury-free light source such as a light-emitting diode or a xenon tube is preferable because an environmentally sound backlight device and an environmentally sound display device having a long lifetime and an excellent recyclability can be produced easily.

Various preferred embodiments of the present invention can be utilized as a backlight device that has a high light utilization efficiency and achieves a high brightness, and a display device using the same.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A backlight device comprising:
a plurality of light sources;
a main light guide plate that has an introduction surface into which light from the light sources is introduced, a light emitting surface arranged to emit the light from the light sources introduced from the introduction surface to an outside, and an opposed surface in opposition to the light emitting surface;
a plurality of auxiliary light guide portions that are disposed as a stack on the main light guide plate on a side of the opposed surface and lead light from any of the plurality of light sources to the introduction surface of the main light guide plate;
a reflector arranged to introduce the light from the light sources from the auxiliary light guide portions to the main light guide plate; and
an obstructing portion that is disposed inside a space surrounded by the reflector and obstructs an entry of the light that has left one of the auxiliary light guide portions in an inner portion of another of the auxiliary light guide portions.

2. The backlight device according to claim 1, wherein first to Nth, N being an integer equal to or larger than 2, auxiliary light guide portions that are stacked on the opposed surface of the main light guide plate in this order from the side of the opposed surface are used as the plurality of auxiliary light guide portions, and (N−1) optical path forming members that respectively form dedicated optical paths in which light from the first to (N−1)th auxiliary light guide portions travels toward the main light guide plate are used as the obstructing portion.

3. The backlight device according to claim 2, wherein a reflecting member that is provided between the two adjacent auxiliary light guide portions is used as the optical path forming members.

4. The backlight device according to claim 1, wherein first to Nth, N being an integer equal to or larger than 2, auxiliary light guide portions that are stacked on the opposed surface of the main light guide plate in this order from the side of the opposed surface are used as the plurality of auxiliary light guide portions, and (N−1) inclined members that are respectively provided to the first to (N−1)th auxiliary light guide portions at predetermined inclination angles so as to cover the auxiliary light guide portions are used as the obstructing portion.

5. The backlight device according to claim 4, wherein a reflecting member that is provided between the two adjacent auxiliary light guide portions is used as the inclined members.

6. The backlight device according to claim 1, wherein a reflecting member that is provided on a side of the opposed surface of the auxiliary light guide portion that is the farthest from the main light guide plate among the plurality of auxiliary light guide portions is used as the reflector.

7. The backlight device according to claim 1, wherein the light sources are arranged in a space surrounded by a reflecting member that is provided on the side of the opposed surface of each of the plurality of auxiliary light guide portions and the corresponding auxiliary light guide portion.

8. The backlight device according to claim 1, wherein a light guide plate that is formed of a resin material is used as the auxiliary light guide portions.

9. The backlight device according to claim 1, wherein a light-emitting diode is used as the light sources.

10. The backlight device according to claim 1, wherein a discharge tube is used as the light sources.

11. The backlight device according to claim 1, wherein a plurality of light-emitting diodes that are aligned and a discharge tube are used as the light sources.

12. A display device comprising:
a display portion; and
a backlight device according to claim 1 arranged to irradiate light onto the display portion.

* * * * *